United States Patent Office 2,913,065
Patented Nov. 17, 1959

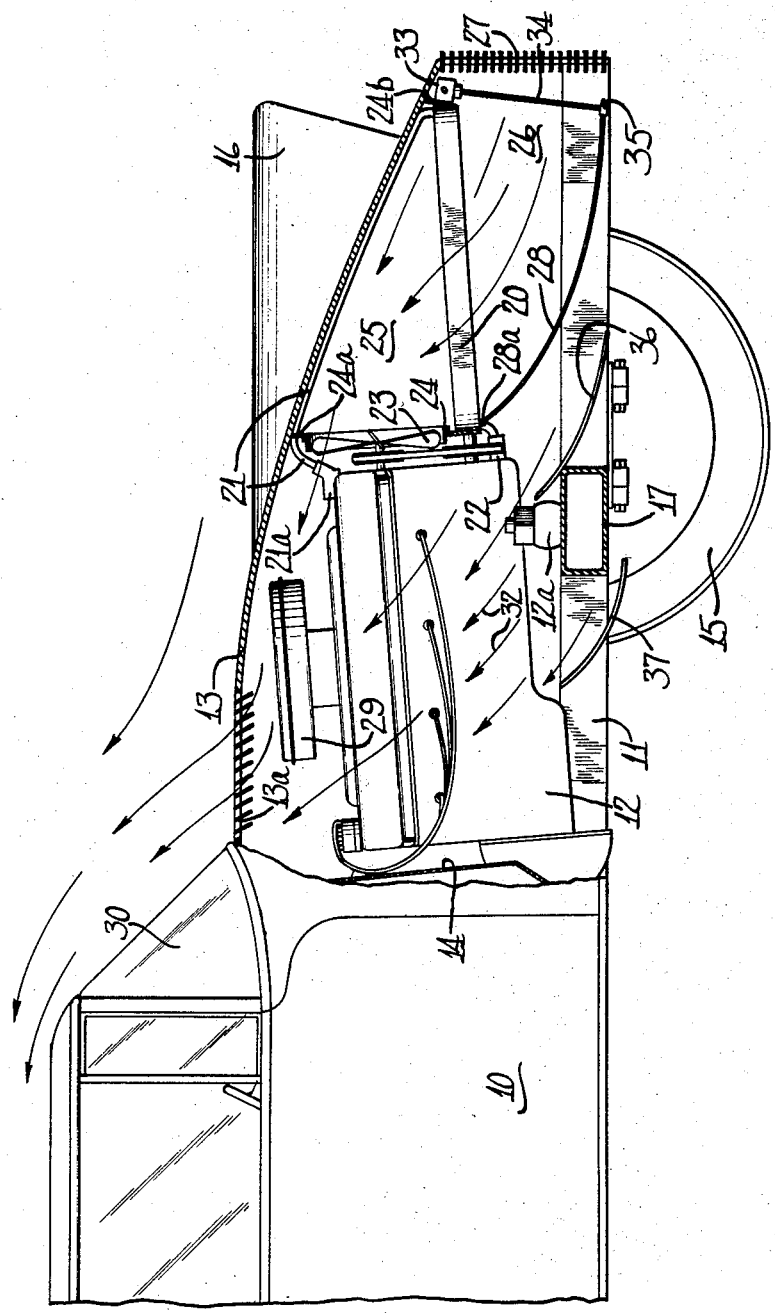

2,913,065

AUTOMOTIVE COOLING SYSTEM

George A. Lyon, Jr., Detroit, Mich.

Application January 23, 1957, Serial No. 635,843

3 Claims. (Cl. 180—54)

The present invention relates to the field of automotive engine cooling and air flow control. More particularly, the present invention is concerned with the provision of a substantially improved arrangement of engine cooling components in combination with additional novel air control means whereby the physical outline of the vehicle may be modified in line with modern design trends and at the same time the operating efficiency of the vehicle is improved.

For many years the automotive industry has primarily employed water cooled gasoline engines as the source of motive power. The utilization of water cooling for the engine has necessitated a cooling water-to-air heat transfer mechanism, ordinarily termed a radiator, and this radiator has in conventional practice been a generally rectangular heat transfer element established in an upright position in the vehicle. In most conventional installations, a fan driven by the engine of the vehicle operates to draw air through the radiator. The air passing through the radiator has, in the past, ordinarily been circulated over the vehicle engine after leaving the radiator, in order to provide still additional cooling of the overall system. Although many efforts have been made to control the air flow through the vehicle radiator in an effective manner little has been accomplished in providing an overall, integrated, cooling system for vehicles such that truly efficient cooling of the vehicle engine is provided at substantially all vehicle speeds and such that the cooling is provided with an absolute minimum of vertical radiator spare requirements.

At present, the trend of the automotive industry is toward lower bodies and, in particular, lower hoods over the vehicle engine compartment. Such lowered hoods are deemed essential in order to provide improved visibility for the vehicle occupant. At the same time that a decrease in height of the hood is occurring, the engine horsepower of the vehicle is increasing at a tremendous rate thereby increasing the need for truly efficient engine cooling means. Thus, while the space permitted for engine cooling is being substantially reduced, the need for better cooling is constantly increasing. In accordance with the principles of the present invention a substantially improved cooling system is provided which is capable of highly efficient operation in an absolute minimum of vertical space and which is more efficient in overall operation than systems heretofore known in the art.

In accordance with the present invention a rectangular water-to-air heat exchanger is employed in a position immediately in front of the conventional vehicle engine. However, instead of being positioned in an upright manner, it is placed on its side in a substantially horizontal position at a level below that of the engine fan. Air from outside of the vehicle is introduced through the front grillwork thereof below the horizontally positioned radiator and is drawn upwardly through the radiator by the vehicle fan. Air leaving the radiator via the fan continues in a generally upwardly sloping direction backwardly across the engine and upwardly out through a plurality of louvers immediately in front of the vehicle windshield. As a result of this arrangement the air is circulated in a substantially straight path upwardly and rearwardly of the vehicle engine compartment and is ejected at a rapid rate upwardly over the windshield. The stream of air passing over the windshield is sufficiently strong to aid in insect deflection and, further, in the colder months the heat in the moving air aids in defrosting control of the windshield proper.

Air passing through the substantially horizontal radiator is controlled by means of an adjustable scoop hinged along an axis generally transverse to the longitudinal axis of the vehicle at a point adjacent the rear edge of the radiator. A motor actuated screw or the like operates to pivot the scoop upwardly toward the radiator in such a manner as to progressively reduce the cross section frontal area of the scoop. Through this means the air flowing through the radiator may be completely shut off if desired. An additional scoop is positioned below and behind the main scoop above described in such a manner as to intercept the flow of air through the vehicle grill in the event the main scoop is closed. The supplemental scoop operates under such circumstances to deflect the air current upwardly around the vehicle engine and over the windshield when the vehicle is operating at a relatively high rate of speed.

As a result of arrangement of the air scoop, radiator and engine in accordance with the present invention, an extremely low hood may be provided which is substantially unobstructed, especially at its forward end. As a result of this placement of parts the hood may be given a substantially downward slope toward the front of the vehicle which is in line with the desires of the modern automotive stylists.

It is, accordingly, not to the present invention to provide a substantially improved cooling system for automotive vehicles.

Still another object of the present invention is to provide a novel automotive engine cooling system employing a horizontally disposed radiator and louvered hood.

Another object of the present invention is to provide an automotive cooling system utilizing a substantially horizontally disposed radiator having means associated therewith for controlling the air flow input thereto.

Another object of the present invention is to provide a novel apparatus for controlling the flow of air over an automotive vehicle engine and windshield.

Yet a further object of the invention is the provision of an engine cooling system for automotive vehicles which incorporates provision for a substantially reduced hood height along with improved cooling efficiency.

A feature of the invention is a motor operated air scoop controlling the air flow through a substantially horizontally disposed cooling water-to-air heat exchanger.

Another feature of the invention is the provision of louvers in the upper rear surface of the vehicle hood for permitting exhaust of circulating air from the vehicle engine compartment upwardly over the vehicle windshield.

Still other and further objects and features of the present invention will at once become apparent to those skilled in the art from a consideration of the attached drawing wherein the figure illustrates, in side elevation and partial cross section, a typical installation of the present invention in an engine compartment of an automotive vehicle.

As shown in the drawings:

As may be seen from consideration of the figure, an automotive vehicle having a body portion 10 supported on a frame 11 is provided with a conventional engine 12.

The engine 12 is supported on the frame 11 by any conventional support means 12a and is positioned beneath the hood member 13 ahead of a fire wall 14 in what is ordinarily termed the engine compartment. For purposes of illustration, although in no way related to the present invention, the drawing incorporates the general position of the vehicle wheels 15 and the front fender 16. The wheels 15 are supported by any conventional axle means positioned, as at 17 to the frame 11. The fender 16 may, of course, take any form desired without affecting the scope of the present invention.

As may be seen from the illustration, the engine 12 is liquid cooled by means of a water-to-air heat exchanger or radiator 20 positioned in a substantially horizontal condition and with the large face area facing downwardly. Circulating cooling liquid is supplied to the radiator 20 via an inlet 21 and an outlet 22 connected with the engine block. In view of the relatively low overall position of the radiator 20 water must be added to the engine cooling system at an elevated point positioned remote from the radiator. This cooling system filling opening may, for example, be provided at the coupling connection 21a. Further, in view of the horizontal position of the heat exchanger 20, water or other cooling liquid must be circulated in a positive manner. This is accomplished through the expediency of a conventional water pump built into the engine 12 in any conventional manner.

Air is circulated through the horizontal radiator 20 by means of engine driven fan 23 positioned within a shroud 24 which cooperates with seals 24a and 24b to provide a confined chamber 25 between the radiator 20 and the hood 13. Air withdrawn from the chamber 25 above the radiator 20 by means of the fan 23 is replaced by air entering the compartment 26 below the radiator via the vehicle front grille 27. During operation of the vehicle at high speeds air enters the grille 27 at a high velocity and is deflected upwardly through the radiator 20 by means of the curved scoop 28 acting to supplement the positive operation of the fan 23.

Air leaving the compartment 25 via the opening in the shroud 24 passes rearwardly and upwardly across the diagrammatically illustrated engine air cleaner 29 and through the hood 13 via louvers 13a. The air is swept back over the windshield 30 along with air traveling backwardly over the vehicle above the hood surface.

As a result of the above arrangement a large radiator 20 may be utilized without requiring substantial vertical space. As a result of this fact, the hood 13 may be lowered substantially, especially at its forward portion, thereby substantially improving the vision of the vehicle operator relative to points on the road immediately ahead of the vehicle. Further, air passing through the louvers 13a provides a blanket of warm air over the windshield 30 aiding in defrosting action, as well as providing an insect deflector in the form of rapidly moving current of air which will sweep insects upwardly over the top of the vehicle. In addition to these positive actions of the air stream passing through the radiator 20, it will also cause, as a result of the reduced pressure derived from the increased velocity of the air flow, an upward circulation of air, along the paths indicated by the arrows 32. This air will cause cooling of the engine 12 and will subsequently be carried through louvers 13a along with the main air flow.

Control of the air flow through the radiator 20 may be varied at will by means of the scoop 28 which is hinged, as at 28a to the rear edge of the radiator 20. An electric motor 33 positioned adjacent the front edge of the radiator 20 drives a rotating screw 34 which cooperates with a nut 35 carried by the scoop 28. Rotation of the screw 34 in the nut 35 will cause the scoop 28 to move upwardly or downwardly, depending upon the direction of rotation, to adjust the forward air inlet area. As the scoop 28 is moved upwardly against the bottom of the radiator 20, substantially all air flow through the radiator 20 is prevented. As may be seen this control is an extremely simple one and permits extremely accurate control of the temperature of the circulating cooling liquid. If desired, operation of the motor 33 may be accomplished through a thermostatically controlled switch to lower the scoop 28 when the engine temperature increases above a predetermined desired figure. Such a thermostat would preferably be placed in the conduit 21, thereby reflecting the temperature of the cooling water as it leaves the engine and enters the radiator 20.

At times when the scoop 28 is moved into its upper position closing off the radiator 20 the secondary scoop 36 operates to deflect air passing beneath the scoop 28 upwardly over the engine 12 and out through the louvers 13a, thereby assuring a flow of relatively cool air over the external surface of the engine and to the air cleaner 29. Additional auxiliary scoops such as that shown at 37 may be provided, if desired, to assure upward circulation of air at all times during vehicle motion.

It will thus be seen that in accordance with the principles of the present invention the vertical space required by the cooling water-to-air heat exchanger required for efficient cooling of modern vehicle engines is reduced to an absolute minimum, thereby permitting lowering of the vehicle hood at its forward portion. In addition to this important accomplishment the system provides air circulation under accurate control of the vehicle operator. Further, the air flow provided through the system as above described provides an extremely efficient insect deflector and windshield defrosting aid materially improving the efficiency of vehicle operation. It will be apparent, of course, that variations and modifications may be made in accordance with the principles of the present invention without departing from the scope of the novel concepts thereof. Accordingly, it is my intention that the present invention be limited solely by the scope of the hereinafter appended claims.

I claim as my invention:

1. In combination in an automotive vehicle having an engine within an engine compartment defined by a hood, a forwardly facing air opening and a rear fire wall, a radiator for cooling said engine, means positioning said radiator ahead of said engine in a substantially horizontal condition with the air passages therethrough extending generally vertically and with the front edge of the radiator positioned above said opening, air moving means driven by said engine for withdrawing air from above said radiator and thereby causing air to move upwardly through the radiator, an air scoop positioned behind said air opening below said radiator and having an upwardly and rearwardly extending surface deflecting air passing through said opening upwardly through said radiator, and means pivoting said scoop about its rear edge at a point immediately adjacent the rear edge of said radiator to thereby control the flow of air through said radiator.

2. In combination in an automotive vehicle having an engine within an engine compartment defined by a hood, a forwardly facing air opening and a rear fire wall, a radiator for cooling said engine, means positioning said radiator ahead of said engine in a substantially horizontal condition with the air passages therethrough extending generally vertically and with the front edge of the radiator positioned above said opening, air moving means driven by said engine for withdrawing air from above said radiator and thereby causing air to move upwardly through the radiator, an air scoop positioned behind said air opening below said radiator and having a hinge at the rear end thereof for pivotal connection with the rear edge of the radiator, said scoop having an upwardly and rearwardly extending surface ahead of said hinge for deflecting air passing through said opening upwardly through said radiator, and motor means drivingly associated with said scop for pivoting said scoop on its hinge toward and away from said radiator.

3. In combination in an automotive vehicle having an engine within an engine compartment defined by a hood, a forwardly facing grille and a rear fire wall, a radiator for cooling said engine, means positioning said radiator ahead of said engine in a substantially horizontal condition with the air passages therethrough extending generally vertically, air moving means driven by said engine for withdrawing air from above said radiator and thereby causing air to move upwardly through the radiator, an air scoop positioned behind said grille below said radiator and having an upwardly and rearwardly extending surface deflecting air upwardly through said radiator, and means pivoting said scoop about its rear edge at a point immediately adjacent the rear edge of said radiator to thereby control the flow of air through said radiator, and auxiliary air scoop means having an upwardly and rearwardly extending surface positioned rearwardly of said air scoop whereby air will be deflected upwardly across said engine by said auxiliary scoop when said air scoop is pivoted upwardly against said radiator.

References Cited in the file of this patent

UNITED STATES PATENTS

| | | |
|---|---|---|
| 1,104,802 | Hupp | July 28, 1914 |
| 2,081,762 | Nissen | May 25, 1937 |
| 2,322,661 | Paton | June 22, 1943 |
| 2,358,663 | Scott-Iversen | Sept. 19, 1944 |
| 2,539,089 | Lear | Jan. 23, 1951 |